(Specimens.)

F. H. GLEW.
MANUFACTURE OF POROUS SHEETS OR SURFACES FOR THE ABSORPTION OF LIQUIDS, &c.

No. 438,998. Patented Oct. 21, 1890.

UNITED STATES PATENT OFFICE.

FREDERICK HARRISON GLEW, OF LONDON, ENGLAND.

MANUFACTURE OF POROUS SHEETS OR SURFACES FOR THE ABSORPTION OF LIQUIDS, &c.

SPECIFICATION forming part of Letters Patent No. 438,998, dated October 21, 1890.

Application filed February 5, 1890. Serial No. 339,285. (Specimens.) Patented in England March 26, 1888, No. 4,609.

*To all whom it may concern:*

Be it known that I, FREDERICK HARRISON GLEW, chemist and druggist, a subject of the Queen of Great Britain, and a resident of London, England, have invented certain new and useful Improvements in the Manufacture of Porous Sheets or Surfaces for the Absorption of Liquids, Gases, and the Like, (for which I have obtained a patent in Great Britain, No. 4,609, dated March 26, 1888,) of which the following is a specification, reference being had to the accompanying drawings.

My invention relates to the manufacture of porous sheets or surfaces for the absorption of liquids, gases, and the like, and is designed to improve the construction of the same.

The invention is particularly designed to provide a new and useful porous surface to be charged with a volatile liquid for use in a medical inhaler such as described and shown by my Letters Patent No. 376,819; but the invention is also useful in chemical analysis and in refrigerators or otherwise where a large surface for rapid evaporation or absorption is desired.

It is essential or highly important that porous surfaces of this kind or class should have a high absorptive power for liquids and gases, and that when charged they may be held in any position without loss of the absorbed matter, except through evaporation. Moreover, for rapidly charging air or other gas with the vapor of any volatile body it is necessary to exhibit as much as possible of the surface of the body to be evaporated.

In carrying my said invention into practice I form sheets or surfaces of suitable non-absorbent or water-proof material—such as gutta-percha—studded with projecting porous particles or granules—such as coke, charcoal, pumice, brick, sponge, or with other suitable porous particles, according to the nature of the liquid or gas to be employed.

In the accompanying drawings I have shown how my said invention may be conveniently and advantageously carried into practice.

Figure 1:
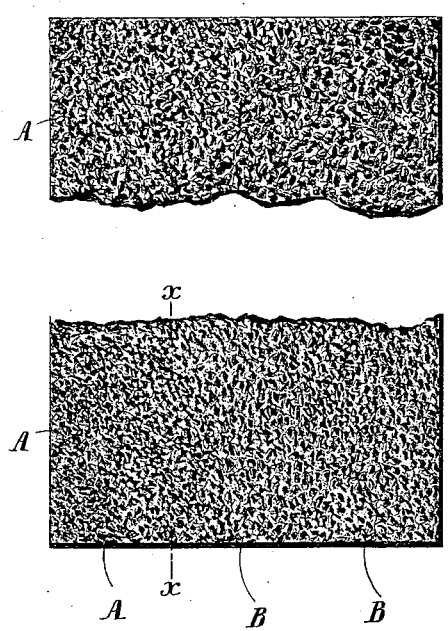
Figure 2:
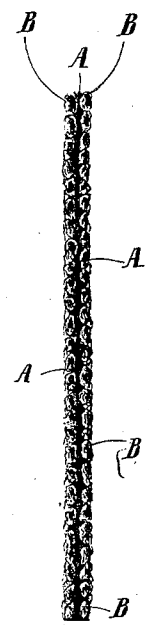

Figure 1 is a plan showing a portion of my improved porous sheets or surface. Fig. 2 is a horizontal section on the line $x$ $x$, Fig. 1, drawn to an enlarged scale.

Like letters indicate corresponding parts throughout the drawings.

A is a basis consisting of some suitable non-absorbent or water-proof material, such as gutta-percha.

B B are particles of porous and highly-absorbent material.

It is obvious that the sheets or surfaces must be formed of materials suited to the liquids or gases to be absorbed and evaporated. For instance, when corrosive liquids are to be absorbed I employ gutta-percha as the basis A and porous particles or granules of coke for the absorbent material B. In preparing the said porous sheet or surface I select the most porous pieces of the said coke and crush or reduce them between iron plates in a mortar, or in any other suitable manner, until the said particles or granules will pass through a sieve having a mesh of eight wires to the linear square inch. The material is then placed in a sieve having a mesh of fourteen wires to the linear square inch, only those particles or granules which are retained in this sieve being made use of. This I have found by practical experience to be the most convenient-sized particles or granules for the absorption of aqueous liquids; but I do not limit myself to this exact size for all liquids. The said particles or granules are then placed in a shallow pan or upon a metallic plate and heated to a temperature sufficient to soften gutta-percha. A thin sheet of gutta-percha, preferably a thirty-second of an inch or thereabout in thickness, is placed upon the heated particles or granules of coke, the heat of which softens the said gutta-percha, so that the said particles or granules stick or adhere to the plastic heated surface. Gentle pressure is applied to the sheet by means of a damp pad of leather or cloth, and the said sheet is then placed upon a flat surface of wood or metal and a hard-wood or other roller passed over it with a slight pressure, so as to partially embed the particles or granules therein and to secure the firm and proper adhesion or attachment of the said particles or granules to the gutta-percha basis A. The sheet thus treated may then be, while still warm and plastic, molded to any convenient shape, or it may be allowed to lie on a flat surface, thus forming a porous surface of separate projecting particles or granules. Either one or both sides, as shown in the drawings, of the basis A may be coated with the said particles or granules B.

The porous sheet or surface may be charged with volatile liquids by dipping or otherwise in a solution of ammonia or other disinfectant, so that the charged surface will give up its vapor to the atmosphere. It thus becomes available for use in medical inhalers—such, for example, as is exhibited by the Letters Patent No. 376,819, issued to me January 24, 1888—for by placing the porous material previously charged with the volatile medicament in the air-passages of such apparatus it is capable of giving off the vapor in great quantity when air is drawn through the inhaler. I also purpose using the porous surfaces for absorbing gases and vapors in chemical analysis, for it is obvious that if the porous material is charged with liquids capable of absorbing gas—for instance, a solution of caustic potash—the said material will absorb carbonic-acid gas from mixed gases passed over the surface so charged. I also purpose using these porous surfaces in refrigerators and wherever a large surface to facilitate rapid evaporation or absorption is desired. The porous material may also be utilized for filtering by placing two or more of the porous surfaces in juxtaposition and permitting the liquid to percolate between the surfaces.

What I claim is—

1. A porous sheet or surface for absorbing liquids and gases, consisting of a water-proof base-sheet studded with porous absorbent granules stuck to the water-proof base-sheet and separated from each other by intervening spaces to form separate and distinct projections, substantially as described.

2. A porous sheet or surface consisting of a gutta-percha basis studded with separate particles or granules of porous material, substantially as described.

3. The improved porous sheet or surface composed of a gutta-percha basis and particles or granules of coke, substantially as described.

In testimony whereof I have hereunto signed my name in the presence of two subscribing witnesses.

FREDERICK HARRISON GLEW.

Witnesses:
A. J. WALLIS TAYLER,
W. A. JACKSON.